United States Patent
La Gala

(10) Patent No.: US 7,425,298 B2
(45) Date of Patent: Sep. 16, 2008

(54) THERMAL DEBURRING MACHINE

(75) Inventor: Francesco La Gala, Cermenate (IT)

(73) Assignee: S.G.M. S.r.L., Monza (MI) (IT)

(*) Notice: Subject to any disclaimer, the term of this patent is extended or adjusted under 35 U.S.C. 154(b) by 404 days.

(21) Appl. No.: 11/352,304

(22) Filed: Feb. 13, 2006

(65) Prior Publication Data

US 2006/0192327 A1   Aug. 31, 2006

(30) Foreign Application Priority Data

Feb. 18, 2005   (IT) .................. MI2005A000251

(51) Int. Cl.
   *C21D 7/00*   (2006.01)
   *B23K 7/06*   (2006.01)
(52) U.S. Cl. .................... 266/51; 266/252
(58) Field of Classification Search ............ 266/48, 266/51, 249, 252
   See application file for complete search history.

(56) References Cited

U.S. PATENT DOCUMENTS 3,992,138 A * 11/1976 Leisner ............ 432/231
4,487,576 A * 12/1984 Martini ............ 432/25
4,826,541 A *  5/1989 Bozhko et al. ....... 266/51

* cited by examiner

*Primary Examiner*—Scott Kastler
(74) *Attorney, Agent, or Firm*—Young & Thompson

(57) ABSTRACT

A thermal deburring machine (1) is described, comprising a press (2) into which a deburring chamber (3) containing the workpieces to be deburred is inserted.

The press (2) and the chamber (3) have a horizontal axis and the chamber (3) is extracted from the press (2) with a horizontal movement to unload the deburred workpieces and to load the workpieces to be deburred.

The chamber (3) is preferably axially slidable in a chamber holder (4) carried by a support (5) moveable in a horizontal direction, at right angles to the axis of the chamber (3).

The machine (1) advantageously comprises two chambers (3) to carry out simultaneously the deburring of the workpieces loaded into the chamber (3) inserted in the press (2) and the unloading/loading of the other chamber (3) positioned outside the press (2).

The machine (1) can also comprise a palletised and robotised system (20) for loading/unloading the workpieces from the chamber (3) positioned outside the press (2).

18 Claims, 6 Drawing Sheets

THERMAL DEBURRING MACHINE

BACKGROUND OF THE INVENTION

The present invention refers to an improved thermal deburring machine for the thermal deburring of workpieces loaded into a deburring chamber included in the press, preferably in an excess oxygen atmosphere.

In the deburring chamber (or, as diagrammatically shown in FIG. 4, in an external mixer connected to the deburring chamber) an explosion is caused in a per se known manner to increase the temperature of the burs on the workpieces to be treated: the burs are oxidised through the effect of the excess oxygen present in the deburring chamber and vaporise.

Since it must withstand the explosion, the press must be able to exert a high force, which depends upon the size of the machine (and in particular of the deburring chamber) and upon the material of which the workpieces to be deburred are made.

Types of thermal deburring machines are known to the art in which the press has a vertical axis, the deburring chamber is fixed and the workpieces to be deburred are introduced by means of a closing plate pressed against the deburring chamber by the piston of the press or by functionally equivalent mechanical means.

Indicatively, the piston makes a stroke of 150-300 mm and presses the plate against the deburring chamber with a force of 180-350 tons.

A deburring machine of the prior art comprises at least a machine bed, two or more lateral pillars which carry a head (which, in turn, carries the fixed deburring chamber), a cylinder—situated in the machine bed—the piston of which carries a plate for closing the deburring chamber and means able to move the piston; the machine bed, the side pillars and the head must be particularly strong since they must withstand the explosion created in the deburring chamber to deburr the workpieces placed in said chamber.

A deburring machine of the prior art is therefore a heavy, bulky and costly equipment and it is also slow because of the stroke of a considerable length that the piston has to perform.

Object of the present invention is to produce a thermal deburring machine able to overcome the limitations presented by the machines of the prior art; this object is achieved by means of a thermal deburring machine, which presents the characterising features illustrated in claim 1.

Further advantageous characteristics of the invention form the subject matter of the dependent claims.

BRIEF DESCRIPTION OF THE DRAWINGS

The invention will now be described with reference to a purely exemplifying and therefore non-limiting embodiment thereof, illustrated in the appended Figures, in which.

DETAILED DESCRIPTION OF THE INVENTION

Figure 1:
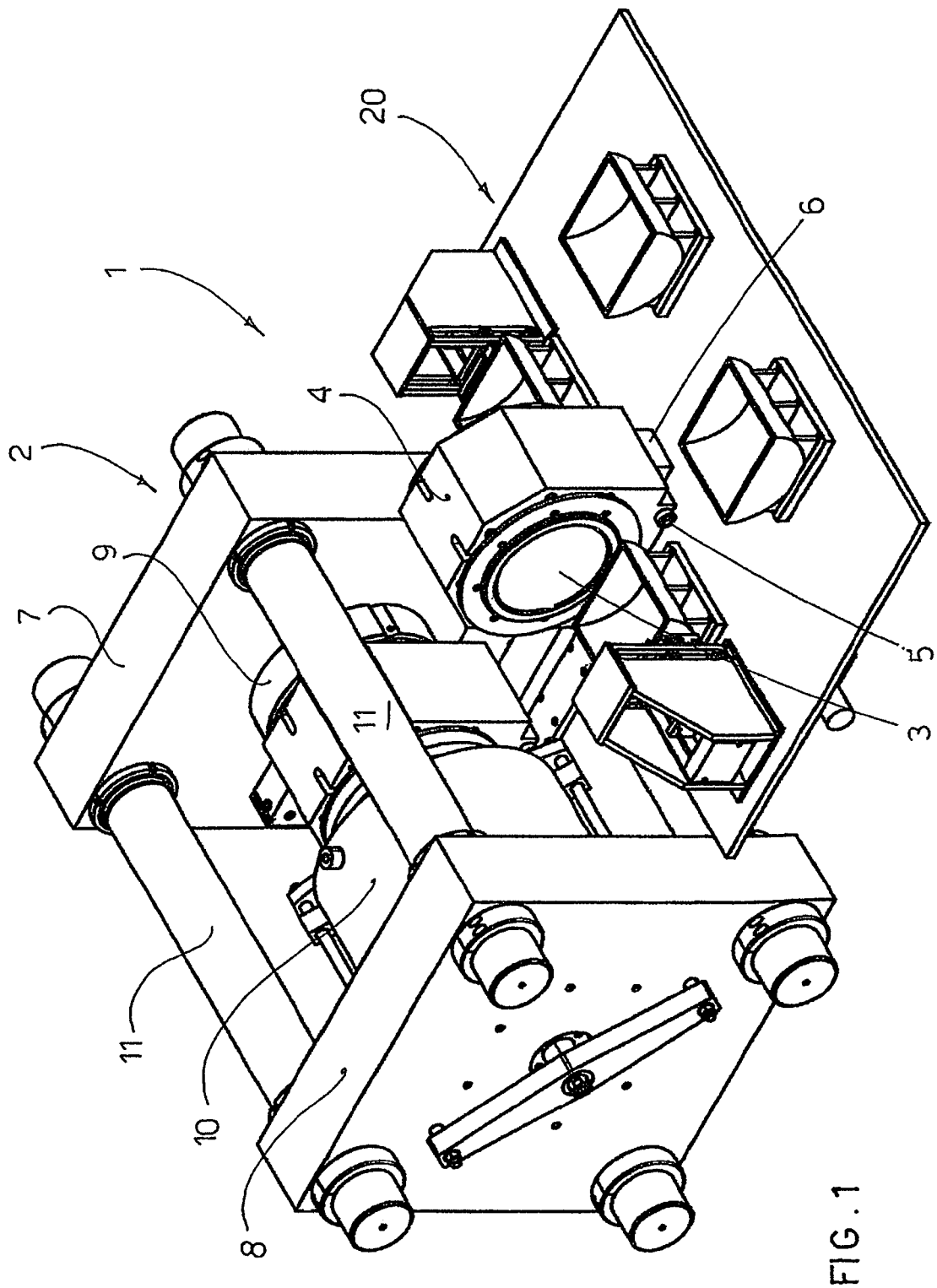
FIG. 1 shows diagrammatically a thermal deburring machine produced according to the invention, with a chamber holder that holds the deburring chamber placed outside the press.

In the appended Figures corresponding items will be identified by the same reference numerals.

FIG. 1 shows diagrammatically a thermal deburring machine 1, produced according to the invention, which comprises a press 2 with a horizontal axis into which is inserted a deburring chamber 3 with a horizontal axis (seen better in FIG. 3) which is moveable and can be extracted from the press 2 to unload the deburred workpieces and to load therein the workpieces to be deburred.

The deburring chamber 3 is preferably extracted from the press 2 horizontally and in any case at right angles to the longitudinal axis of the deburring chamber 3.

The deburring chamber 3 is preferably cylindrical and is open at the two ends but, without departing from the scope of the invention, the chamber 3 can take on the shape considered most advantageous each time to meet specific requirements.

The deburring chamber 3 is placed in a chamber holder 4 (seen better in FIG. 3) inside which it can slide axially; the chamber holder 4 consists of a metal block—which acts as a heat sink for the heat which develops in the chamber 3 at the time of the explosion—carried by a support 5, moveable horizontally and in any case at right angles to the longitudinal axis of the deburring chamber 3.

Figure 2:
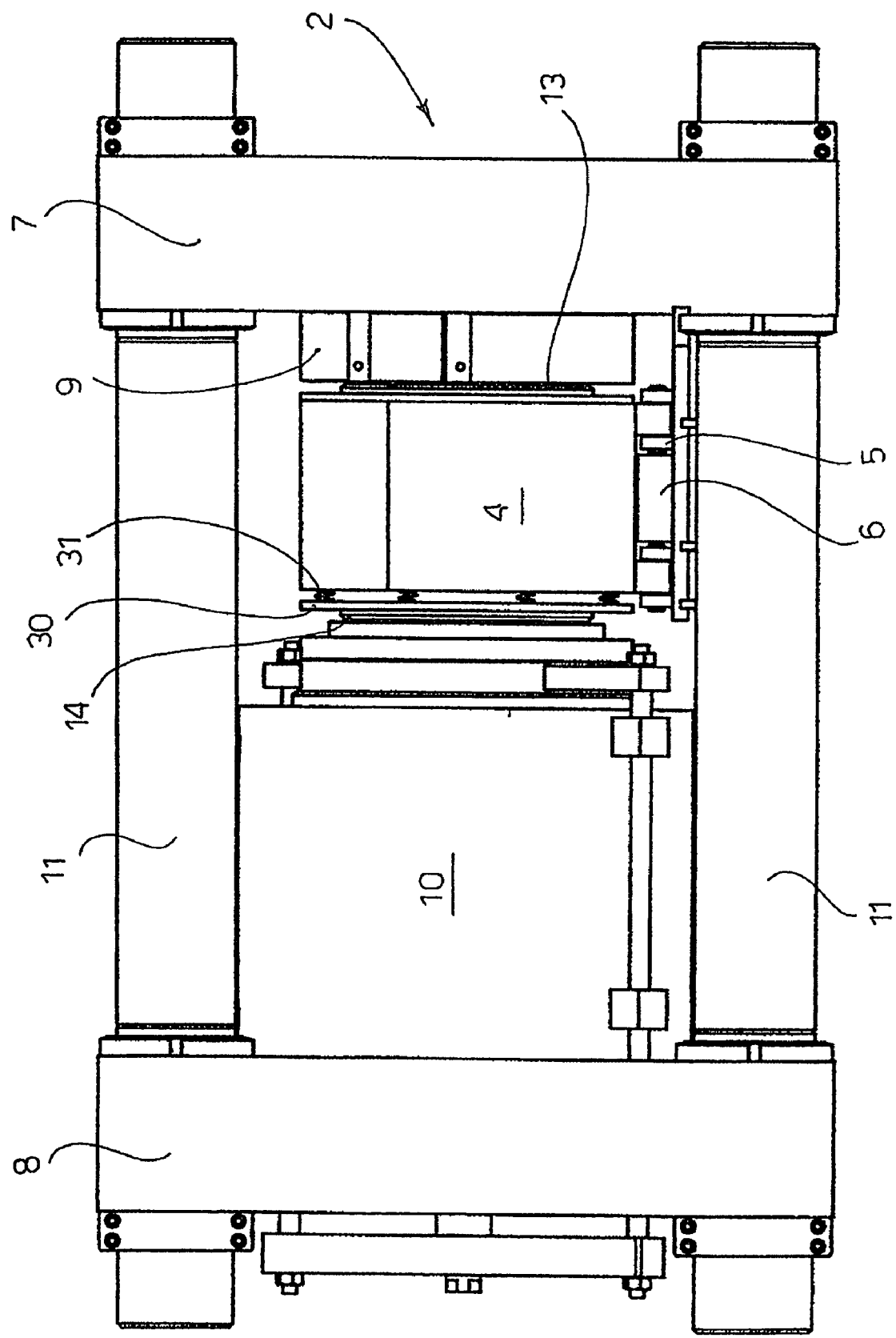
FIG. 2 shows diagrammatically a front view of the machine of FIG. 1 with the chamber holder placed in the press.
Figure 4:
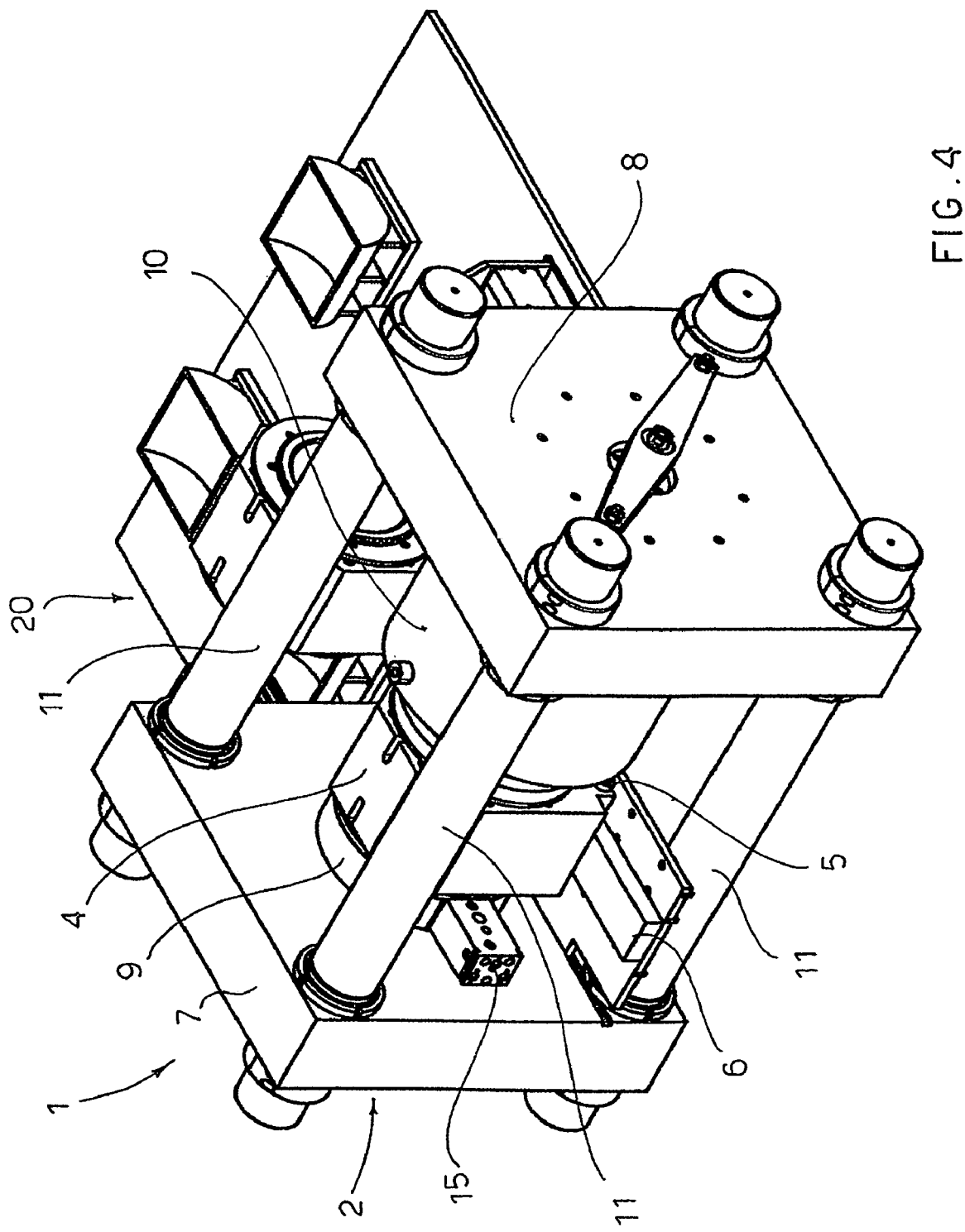
FIG. 4 shows diagrammatically an axonometric view of the rear part of the machine of FIG. 1.

The support 5 preferably consists of a carriage which slides on guides 6 which are horizontal and in any case at right angles to the longitudinal axis of the deburring chamber 3; the support 5 and the guides 6 can be seen in FIG. 2 and better seen in FIG. 4.

Without departing from the scope of the invention, the deburring chamber 3 is integral with the chamber holder 4 and the support 5 is moveable both in a direction at right angles to the longitudinal axis of the deburring chamber 3 and along said axis, for example by means of a second carriage.

The press 2 consists of two slabs (7, 8) and of means able to hold in position the two slabs (7, 8): in the embodiment shown in FIG. 1 the two slabs (7, 8) are connected by four pillars 11 which, without departing from the scope of the invention, can be replaced by a top slab and by a bottom slab and/or by other known means, functionally equivalent and able to connect and to hold in position the slabs 7 and 8.

The slab 7 carries a fixed element 9 (FIG. 2); the slab 8 carries means 10 (consisting, in the embodiment described herein, of a hydraulic cylinder) adapted to bring the deburring chamber 3 up to the fixed element 9 and to press it thereagainst with a force sufficient to withstand that of the explosion; without departing from the scope of the invention, the approaching means 10 can also be mechanical means, per se known.

The slab 8 further carries means (omitted in the appended figures because they are per se known and in any case they are outside the scope of the invention) adapted to operate the approaching means 10.

In the embodiment illustrated here, the guides 6 are also present on the side of the machine opposite that shown in FIG. 1 and the machine 1 comprises two deburring chambers 3 placed in chamber supports 4 carried by supports 5 moveable on the guides 6: this allows to insert a deburring chamber 3 into the press 2 for performing the deburring of the workpieces loaded therein and at the same time to carry out the unloading/loading operation on the other deburring chamber 3 situated outside the press 2, thus halving (or in any case drastically reducing) the operating cycle of the machine 1 and increasing therefore the productivity.

The operations of loading/unloading workpieces on/from the deburring chamber 3 are advantageously performed by means of a palletised and robotised system, denoted as a whole with reference numeral 20, which will be described with reference to FIG. 5.

The palletised and robotised unloading/loading system can be omitted without departing from the scope of the invention.

FIG. 2 shows diagrammatically a front view of the machine 1, without the unloading/loading system 20, in which the chamber holder 4 is situated inside the press 2; in FIG. 2 the chamber holder 4 carried by the support 5, the slab 7 which carries the fixed element 9, the slab 8 which carries the approaching means 10 and the pillars 11 which connect the slabs (7, 8) to one another can be seen.

Also visible in FIG. 2 are the retaining means (13, 14) situated at the ends of the deburring chamber 3, which have a chamfered entry guide with a gasket to ensure that the deburring chamber 3 is tightly sealed when the approaching means 10 bring it up to the fixed element 9 and press it thereagainst.

Advantageous characteristics of a machine produced according to the invention are that the deburring chamber 3 is loaded/unloaded outside the press 2 and that, since the chamber holder 4 (which carries the chamber 3) is inserted laterally into the press 2, the resting distance between the approaching means 10 and the fixed element 9 can be little greater than the thickness of the chamber holder 4: consequently it is easier and faster to load/unload the deburring chamber 3 and the approaching means 10 make a stroke of limited length (typically about 1-50 mm, preferably about 20-25 mm) to press the sealing means 14 against the approaching means 10, to bring the deburring chamber 3 up to the fixed element 9 and to press the sealing means 13 against the fixed element 9 with the force necessary to ensure a tight sealing at the time of the explosion.

This stroke of limited length is advantageous since it allows the operating speed to be increased and the size of the machine 1 to be limited.

Once the deburring of the workpieces contained in the chamber 3 has been carried out, the approaching means 10 are made to step back to disengage the chamber holder 4 from the fixed element 9 and from the approaching means 10.

In the embodiment described herein, the disengagement of the chamber 3 is facilitated by the flange 30 (FIG. 3), present on the side of the chamber holder 4 facing the approaching means 10, which is integral with the deburring chamber 3 and is biased by the springs 31 which, when the approaching means 10 are made to step back, move the flange 30 away from the chamber holder 4 and disengage the chamber 3 from the fixed element 9.

Figure 3A:
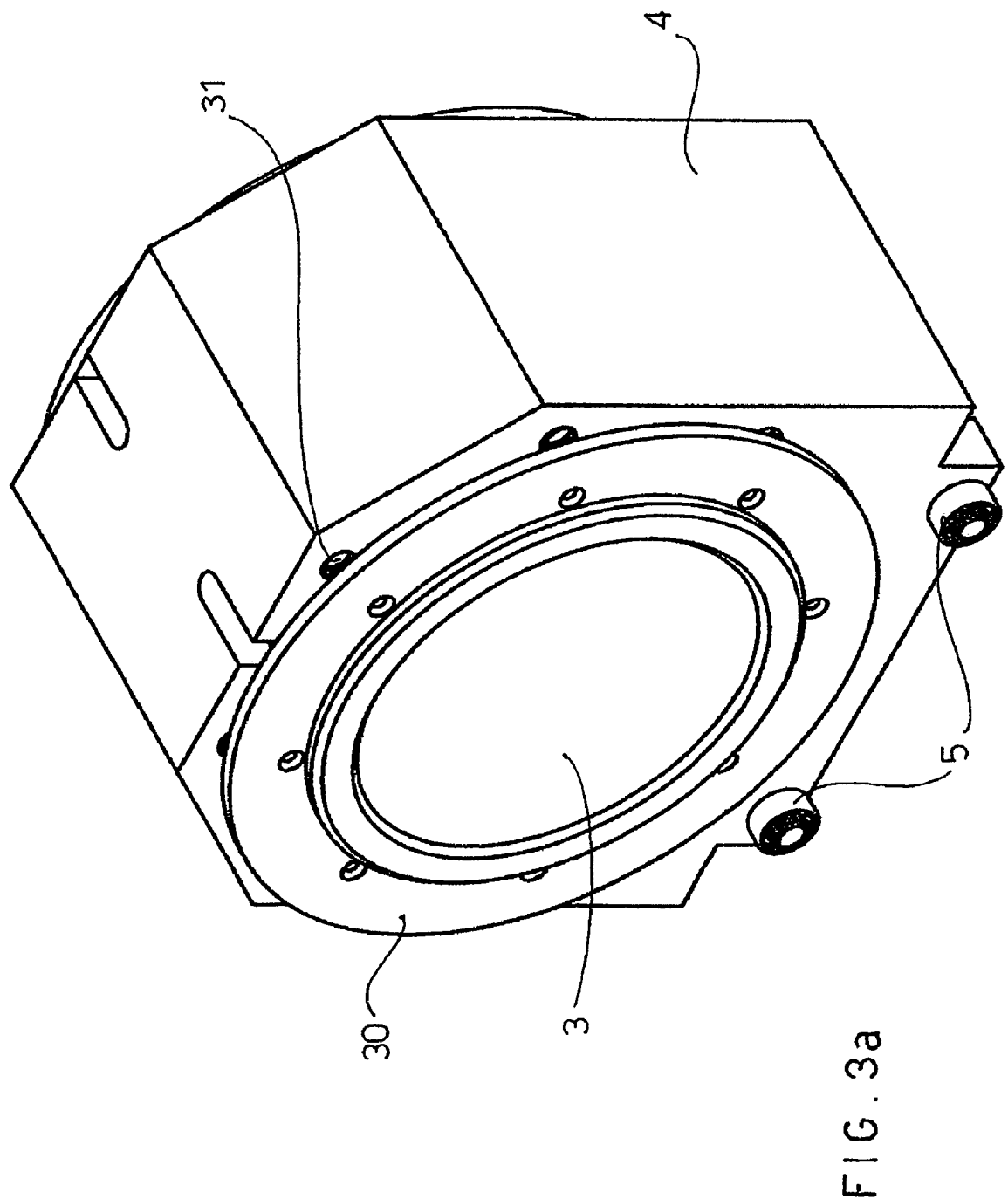
FIG. 3 shows diagrammatically a perspective view, a front view and a longitudinal sectional view of the chamber holder.
Figure 3C:
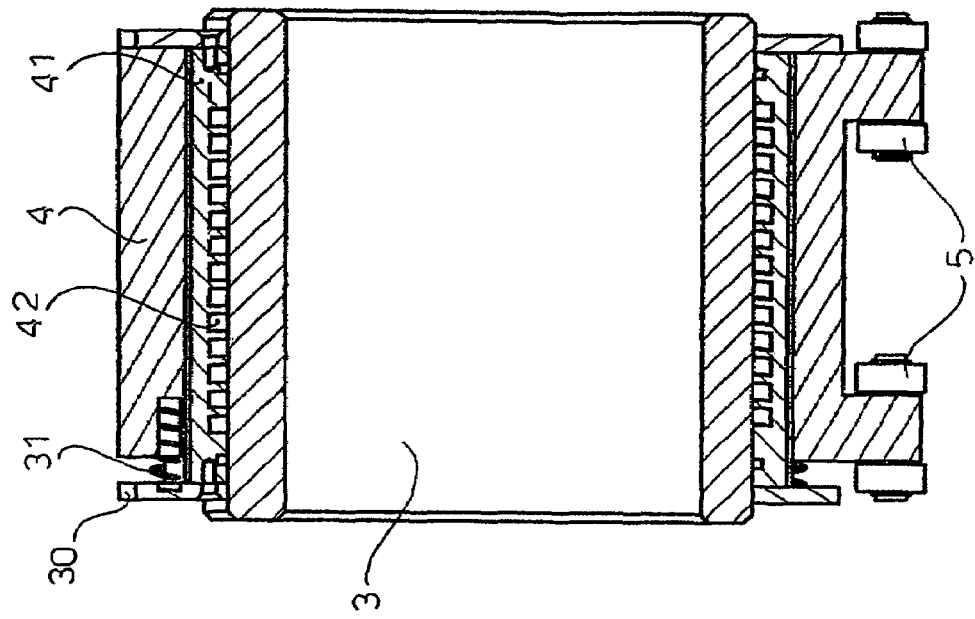
Figure 3B:
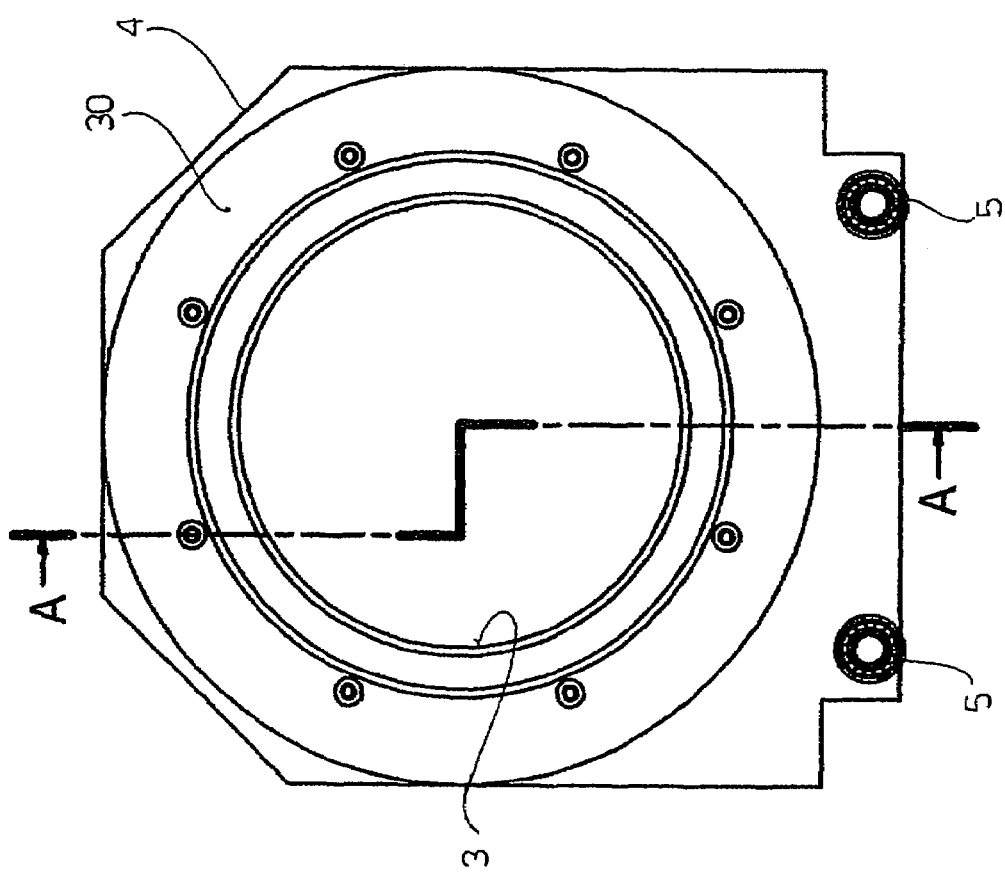

FIG. 3 shows diagrammatically a perspective view (FIG. 3a), a front view (FIG. 3b) and a sectional view (taken along the section plane AA of FIG. 3b; FIG. 3c) of the chamber holder 4 (holding the deburring chamber 3) and of the relative support 5, preferably consisting of a carriage adapted to slide along the guides 6.

In the embodiment shown in FIG. 3, on the side of the chamber holder 4 facing the plate 14 carried by the approaching means 10 there is the flange 30, integral with the deburring chamber 3 and biased by the springs 31. Furthermore, as shown in FIG. 3c, between the deburring chamber 3 and the chamber holder 4 at least a tube 41 made of Teflon® (or other functionally equivalent means) is interposed, which allows the deburring chamber 3 to slide axially inside the chamber holder 4 but, without departing from the scope of the invention, the deburring chamber 3 can be integral with the chamber holder 4, which is made to slide along the longitudinal axis of the chamber 3 by the approaching means 10.

Lastly, cooling means 42 (consisting in FIG. 3c, by way of a non-limiting example, of a cooling coil) can be advantageously provided on the outside wall of the deburring chamber 3 to remove at least a part of the heat present in the chamber 3 upon the deburring of the workpieces contained therein.

FIG. 4 shows diagrammatically an axonometric view of the rear part of the machine 1 of FIG. 1; FIG. 4 shows the slabs (7, 8) connected and held in position by the pillars 11, the fixed element 9 carried by the slab 7, the approaching means 10 carried by the slab 8 and a mixer 15, situated inside the press 2 alongside the chamber holder 4 and connected to the deburring chamber 3, in which an explosion is caused (in a per se known manner) to deburr the workpieces placed inside the chamber 3.

Figure 5:
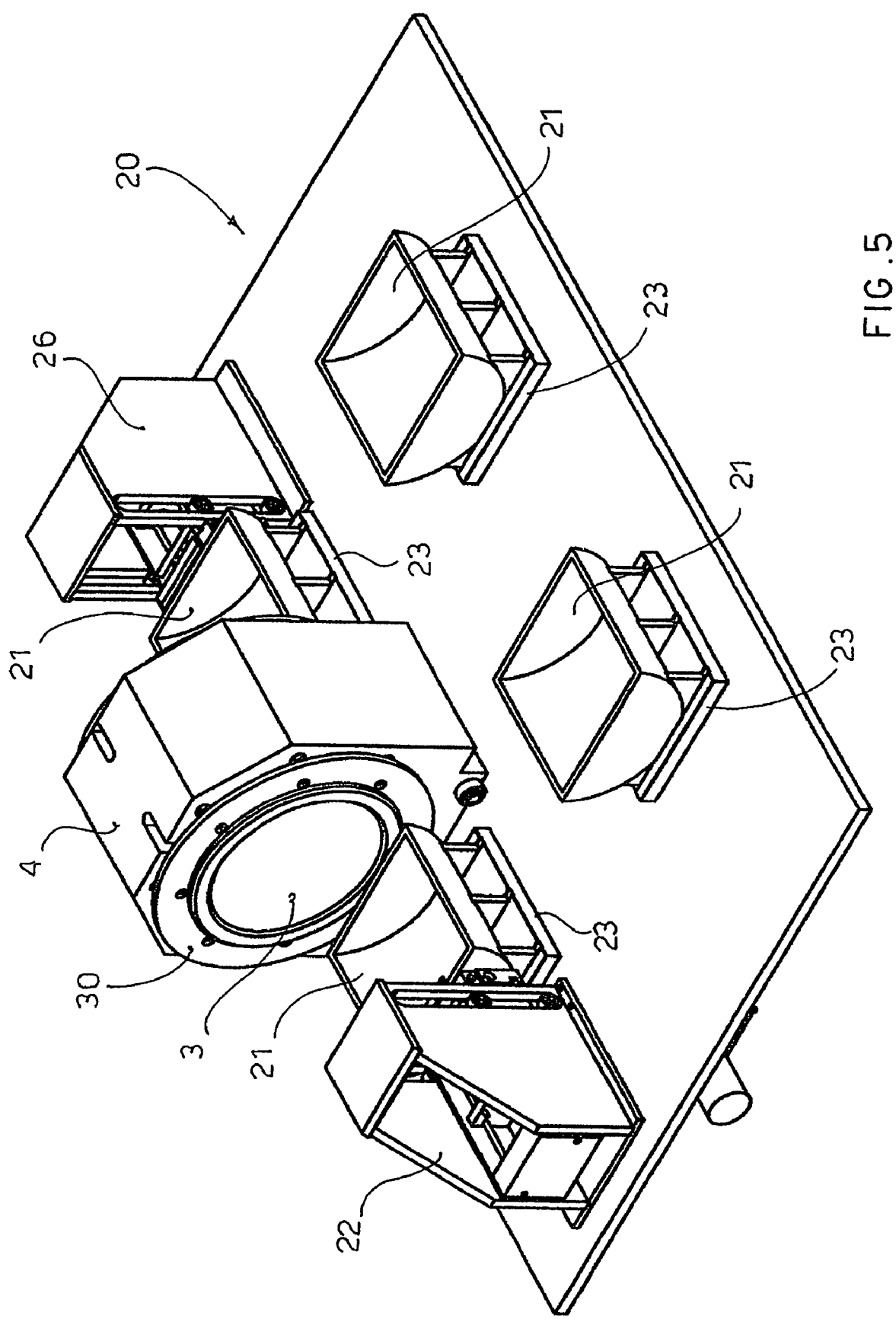
FIG. 5 shows diagrammatically a palletised and robotised system for unloading/loading workpieces from/on a deburring chamber adapted to equip the machine of FIG. 1.

FIG. 5 shows diagrammatically the palletised and robotised system—denoted as a whole in FIG. 1 with the reference numeral 20—adapted to unload/load the workpieces from/on a deburring chamber 3 inserted in a chamber holder 4 (not visible in FIG. 5) situated outside the press 2.

The palletised and robotised system 20 comprises a plurality of baskets (or pallets) 21—preferably made of perforated stainless steel (or of other material able to withstand the effects of the explosion) and containing the workpieces to be deburred and the deburred workpieces, respectively—and a robotised system which takes a basket 21 containing the deburred pieces from the deburring chamber 3 and places it on a support 23 and which takes a basket 21 containing the workpieces to be deburred from another support 23 and places it in the deburring chamber 3.

The movement of the supports 23 which carry the baskets 21 containing the workpieces to be deburred and the deburred workpieces is advantageously automated (in a per se known manner) for example by means of a system of translators but, without departing from the scope of the invention, the supports 23 are moved by an operator.

During the operating cycle of the machine 1 (that is, whilst the chamber holder 4 is inserted in the press 2, the workpieces contained in the basket 21 are deburred and the chamber holder 4 returns to the unloading/loading position shown in FIGS. 1 and 5) an operator unloads the deburred workpieces from the basket 21 taken from the deburring chamber 3 and replaces them with the workpieces to be deburred.

If the guides 6 (not visible in FIG. 5) are present on both sides of the machine 1, the palletised and robotised system 20 is (or can be) advantageously present on both sides of the machine 1.

The robotised system comprises an inserter 22 and an extractor 26, situated on the opposite sides of the chamber 3 when it is placed outside the press 2, each of which comprises means (for example a linear actuator or a functionally equivalent mechanical or hydraulic device) adapted to actuate gripping means for a basket 21 to make them translated with a reciprocating movement parallel to the longitudinal axis of the deburring chamber 3.

The actuating means are not visible in FIG. 5 because they are hidden by the covers of the inserter 22 and of the extractor 26 whilst the gripping means are hidden by the baskets 21.

A supporting fork and a gripping jaw can advantageously be present at the end of the gripping means.

A possible procedure for replacing in the deburring chamber a basket 21 containing deburred workpieces with a basket 21 containing workpieces to be deburred may be the following:

to place the chamber holder 4 including a basket 21 containing the deburred workpieces between the inserter 22 and the extractor 26;

to place a basket 21 containing workpieces to be deburred between the inserter 22 and the chamber holder 4;

to actuate the actuating means of the extractor 26 to deploy the gripping means and to insert them in the chamber 3 to draw the basket 21 containing the deburred workpieces;

to actuate the actuating means of the extractor 26 to step back the gripping means, releasing the extractor 26 from the chamber holder 4;

to actuate the actuating means of the inserter 22 to deploy the gripping means and to carry the basket 21 containing the workpieces to be deburred into the chamber 3;

to actuate the actuating means of the inserter 22 to retract the gripping means, releasing the inserter 22 from the chamber holder 4;

to place a further basket 21 containing workpieces to be deburred between the inserter 22 and the chamber holder 4 and to remove the basket 21 containing the deburred workpieces from the extractor 26.

At this point, the robotised system is ready to repeat cyclically the procedure described summarily above by way of a non-limiting example.

A person skilled in the art can make to the thermal deburring machine described herein, without departing from the scope of the invention, all changes or improvements suggested by normal experience and/or by the natural evolution of the art.

The invention claimed is:

1. An improved thermal deburring machine (1) characterized in that it comprises at least one press (2) with a horizontal axis into which a deburring chamber (3) with a horizontal axis, which carries the workpieces to be deburred, is inserted and in that the deburring chamber (3) is moveable and can be extracted from the press (2) to unload the deburred workpieces and to load therein the workpieces to be deburred.

2. A machine (1) as in claim 1, characterised in that the deburring chamber (3) is open at the two ends.

3. A machine (1) as in claim 1, characterised in that the deburring chamber (3) is extracted from the press (2) in a direction at right angles to the longitudinal axis of the deburring chamber (3).

4. A machine (1) as in claim 3, characterised in that the deburring chamber (3) slides axially in a chamber holder (4) carried by a support (5) moveable in a direction at right angles to the longitudinal axis of the deburring chamber (3).

5. A machine (1) as in claim 4, characterised in that means adapted to allow the deburring chamber (3) to slide axially inside the chamber holder (4) are interposed between the deburring chamber (3) and the chamber holder (4).

6. A machine (1) as in claim 4, characterised in that cooling means (42) are interposed between the deburring chamber (3) and the chamber holder (4).

7. A machine (1) as in claim 4, characterised in that the support (5) consists of a carriage that slides on guides (6) at right angles to the longitudinal axis of the deburring chamber (3).

8. A machine (1) as in claim 3, characterised in that the deburring chamber (3) is integral with a chamber holder (4) carried by a support (5) moveable both in a direction at right angles to the longitudinal axis of the deburring chamber (3) and along said longitudinal axis.

9. A machine (1) as in claim 1, characterised in that the press (2) consists of a first and a second slab (7, 8) and of means adapted to hold the two slabs (7, 8) in position, in that the first slab (7) carries a fixed element (9) and in that the second slab (8) carries 5 means (10) adapted to approach the deburring chamber (3) to the fixed element (9) and means adapted to the operate the approaching means (10).

10. A machine (1) as in claim 9, characterised in that at the ends of the deburring chamber (3) there are first and second means (13, 14) adapted to ensure the sealing of 10 the deburring chamber (3) when the approaching means (10) bring it up to the fixed element (9) and press it thereagainst.

11. A machine (1) as in claim 10, characterised in that the approaching means (10) make a stroke of about 1-50 mm to press the second sealing means (14) against the 15 approaching means (10), to bring the deburring chamber (3) up to the fixed element (9) and to press the first sealing means (13) against the fixed element (9).

12. A machine (1) as in claim 10, characterised in that, once the deburring of the workpieces contained in the deburring chamber (3) has been performed, the 20 approaching means (10) are made to step back to release the chamber holder (4) from the fixed element (9) and from the approaching means (10).

13. A machine (1) as in claim 10, characterised in that the chamber holder (4) has, on the side facing the approaching means (10), a flange (30) integral with the deburring 25 chamber (3) and biased by springs (31) and in that, when the approaching means (10) are made to step back, the springs (31) move the flange (30) away from the chamber holder (4) releasing the deburring chamber (3) from the fixed element (9).

14. A machine (1) as in claim 7, characterised in that the guides (6) are present on 30 both sides of the machine (1) and in that it comprises two deburring chambers (3), situated in chamber holders (4) carried by supports (5) moveable on the guides (6), to carry out simultaneously the deburring of the workpieces loaded in the deburring chamber (3) inserted in the press (2) and the unloading/loading of the other deburring chamber (3) situated outside the press (2).

15. A machine (1) as in claim 1, characterised in that it further comprises at least one palletised and robotised system (20) adapted to facilitate the unloading/loading of the workpieces from/on a deburring chamber (3) inserted in a chamber holder (4) situated outside the press (2).

16. A machine (1) as in claim 15 characterised in that the palletised and robotised system (20) comprises a plurality of baskets (21) containing the workpieces to be deburred and the deburred workpieces, respectively, and a robotised system adapted to take a basket (21) containing deburred workpieces from the deburring chamber (3) and to place it on a support (23) and to take a basket (21) containing workpieces to be deburred from another support and to place it in the deburring chamber (3).

17. A machine (1) as in claim 16 in which the guides (6) are present on both sides of the machine (1), characterised in that a palletised and robotised system is situated on both sides of the machine.

18. A machine (1) as in claim 16, characterised in that the robotised system comprises an inserter (22) and an extractor (26) situated on opposite sides of the deburring chamber (3) when it is situated outside the press (2) and in that the inserter (22) and the extractor (26) comprise means adapted to operate gripping means of a basket (21) to make them translate with a reciprocating movement parallel to the longitudinal axis of the deburring chamber (3).

* * * * *